（12）United States Patent
Honcoop et al.

US010876009B2

(10) Patent No.: US 10,876,009 B2
(45) Date of Patent: Dec. 29, 2020

(54) AQUEOUS BINDER SYSTEM, A COATING COMPOSITION AND A COATING

(71) Applicants: Croda International Plc, Goole East Yorkshire (GB); Croda, Inc., Edison, NJ (US)

(72) Inventors: Wilhelmus Adrianus Jacobus Honcoop, TM Bergambacht (NL); Barend van de Velde, BX Rheden (NL); Johannes Hendrik Lexmond, KR Gouda (NL); Mei-Ly Chua, Levittown, PA (US)

(73) Assignees: Croda International PLC; Croda, Inc., Edison, NJ (US)

( * ) Notice: Subject to any disclaimer, the term of this patent is extended or adjusted under 35 U.S.C. 154(b) by 0 days.

(21) Appl. No.: 16/348,007

(22) PCT Filed: Nov. 17, 2017

(86) PCT No.: PCT/US2017/062186
§ 371 (c)(1),
(2) Date: May 7, 2019

(87) PCT Pub. No.: WO2018/102152
PCT Pub. Date: Jun. 7, 2018

(65) Prior Publication Data
US 2019/0292380 A1   Sep. 26, 2019

Related U.S. Application Data

(60) Provisional application No. 62/428,124, filed on Nov. 30, 2016.

(51) Int. Cl.
| | | |
|---|---|---|
| *C09D 5/14* | (2006.01) | |
| *A01N 33/12* | (2006.01) | |
| *C08K 5/19* | (2006.01) | |
| *C09D 175/06* | (2006.01) | |
| *C09D 175/12* | (2006.01) | |
| *C09D 7/63* | (2018.01) | |
| *C08G 18/73* | (2006.01) | |
| *C08G 18/08* | (2006.01) | |
| *C09D 175/04* | (2006.01) | |
| *C08G 18/40* | (2006.01) | |
| *C08G 18/62* | (2006.01) | |
| *C09D 175/14* | (2006.01) | |
| *C08G 18/50* | (2006.01) | |
| *C08G 18/32* | (2006.01) | |
| *C08G 18/65* | (2006.01) | |
| *B05D 7/16* | (2006.01) | |

(Continued)

(52) U.S. Cl.
CPC ............... *C09D 5/14* (2013.01); *A01N 33/12* (2013.01); *C08G 18/0814* (2013.01); *C08G 18/3275* (2013.01); *C08G 18/4063* (2013.01); *C08G 18/5021* (2013.01); *C08G 18/6245* (2013.01); *C08G 18/6535* (2013.01); *C08G 18/73* (2013.01); *C08K 5/19* (2013.01); *C09D 7/63* (2018.01); *C09D 175/04* (2013.01); *C09D 175/06* (2013.01); *C09D 175/12* (2013.01); *C09D 175/14* (2013.01); *B05D 3/007* (2013.01); *B05D 7/16* (2013.01); *B05D 7/50* (2013.01); *B05D 2201/00* (2013.01); *B05D 2202/00* (2013.01); *B05D 2401/20* (2013.01); *B05D 2503/00* (2013.01)

(58) Field of Classification Search
CPC ...... C09D 5/14; C09D 175/14; C09D 175/04; C09D 7/63; C09D 175/12; C09D 175/06; C08G 18/6535; C08G 18/3275; C08G 18/5021; C08G 18/0814; C08G 18/73; C08G 18/6245; C08G 18/4063; A01N 33/12; C08K 5/19; B05D 3/007; B05D 7/16; B05D 7/50; B05D 2201/00; B05D 2202/00; B05D 2401/20; B05D 2503/00
See application file for complete search history.

(56) References Cited

U.S. PATENT DOCUMENTS

| | | | |
|---|---|---|---|
| 6,242,526 B1 * | 6/2001 | Siddiqui ............... | A01N 33/12 524/156 |
| 2007/0077348 A1 * | 4/2007 | Lu ............................ | A61L 29/16 427/2.26 |

(Continued)

FOREIGN PATENT DOCUMENTS

| | | |
|---|---|---|
| WO | 2014118350 A1 | 8/2014 |
| WO | 2014191503 A1 | 12/2014 |

OTHER PUBLICATIONS

International Search Report and Written Opinion for International Application No. PCT/US2017/062186, dated Mar. 14, 2018—9 pages.

(Continued)

*Primary Examiner* — William P Fletcher, III
(74) *Attorney, Agent, or Firm* — RatnerPrestia

(57) ABSTRACT

An aqueous binder system is described for a coating composition, the aqueous binder system comprising A) at least 10 wt % water, based on the total weight of the aqueous binder system; B) at least one hydroxyl-functional binder polymer; and C) from 0.1 to 20 wt %, based on the total weight of the aqueous binder system, of at least one quaternary ammonium compound, wherein the quaternary ammonium compound comprises a core quaternary ammonium group which has pendant groups as described. A coating composition, a coating, methods and uses are also provided.

13 Claims, No Drawings

(51) Int. Cl.
    *B05D 3/00*     (2006.01)
    *B05D 7/00*     (2006.01)

(56) References Cited

U.S. PATENT DOCUMENTS

| | | | | |
|---|---|---|---|---|
| 2009/0117164 A1* | 5/2009 | Toreki | ............... | A01N 33/12 |
| | | | | 424/405 |
| 2010/0113871 A1* | 5/2010 | Dias | ............ | A61L 27/34 |
| | | | | 600/101 |
| 2011/0124772 A1 | 5/2011 | Wang et al. | | |
| 2014/0017238 A1 | 1/2014 | Murphy et al. | | |
| 2015/0361276 A1* | 12/2015 | Mahmoud | ............ | A01N 25/10 |
| | | | | 523/122 |

OTHER PUBLICATIONS

International Preliminary Report on Patentability and Written Opinion for Application No. PCT/US2017/062186, dated Jun. 4, 2019,—9 pages.

\* cited by examiner

AQUEOUS BINDER SYSTEM, A COATING COMPOSITION AND A COATING

Cross Reference To Related Applications

This application is the National Stage filing of International Appln. No. PCT/US2017/062186, filed Nov. 17, 2017, and claims priority to US Provisional Application No. 62/428,124, filed Nov. 30, 2016, both of which are incorporated herein by reference for all purposes.

FIELD OF INVENTION

The present invention relates to an aqueous binder system, a coating composition comprising the aqueous binder system and a coating formed from the coating composition e.g. by curing the coating composition. The invention also relates to associated methods and uses.

BACKGROUND

Coating compositions typically contain a carrier liquid, one or more binder polymers, and additives. Each of these may comprise a single component or a plurality of components. A coating composition which comprises a colourant such as a pigment and/or dye as an additive may be known as a paint.

A coating composition may comprise an aqueous binder system. For example, a polyurethane coating composition may comprise an aqueous binder system and a polyisocyanate. The aqueous binder system comprises water and one or more hydroxyl functional components which will react with the polyisocyanate when these components are mixed together. Since the aqueous binder system and the polyisocyanate are mutually reactive, they may be stored separately.

An aqueous binder system may comprise at least one hydroxyl functional binder polymer. During application of the coating composition to a substrate, reaction of the binder polymer(s) causes the coating composition to form a film on and adhere to the substrate. The process of forming the coating on the substrate after application of the coating composition to the substrate may be known as curing. The cured coating may have various desirable properties such as hardness and chemical resistance.

Many additives may be included in a coating composition and/or an aqueous binder system for a coating composition. These include pigments rheology modifiers, catalysts, stabilisers, emulsifiers, dispersants and other surfactants. An anti-microbial additive is an additive which has an anti-bacterial effect, for example a bacteriostatic and/or bactericidal effect. An anti-microbial additive may also have an anti-viral effect and/or an anti-fungal effect.

Some quaternary ammonium compounds have an antibacterial effect by damaging cell membranes and killing bacteria. This mechanism is likely due to the positive charge site on the quaternary ammonium group interacting with negative charge sites on the bacteria.

Quaternary ammonium compounds are not typically included in aqueous binder systems or coating compositions due to a perceived likelihood of a negative effect on the system and/or composition. Without being limited by theory, it is believed that the cationic nature of some quaternary ammonium compounds may not be compatible with the generally anionic nature of many coating compositions.

SUMMARY OF THE INVENTION

A polyurethane coating may be formed from a two component coating composition. The two component coating composition may comprise an isocyanate functional component (e.g. a polyisocyanate) and a hydroxyl functional component. These two components may react upon mixing and so may be stored separately. The hydroxyl functional component may be an aqueous binder system which comprises water, a hydroxyl functional binder polymer and other additives.

The present invention is based in part on the recognition by the applicant that including certain quaternary ammonium compounds in an aqueous binder system may provide surprising anti-microbial properties to a cured coating without adversely affecting one or more desired properties such as compatibility within the aqueous binder system and/or coating composition and hardness and/or chemical resistance of the cured coating. Without being bound by theory, it is believed that this may be due to the quaternary ammonium compound comprising a limited range of from 5 to 12 alkylene oxide residues and being free and unreacted in the aqueous binder system.

When included in an aqueous binder system, the quaternary ammonium compounds of the invention remain compatible with the binder system and subsequent coating composition despite their positive/cationic charge. When the quaternary ammonium compound is free and unreacted in the aqueous binder system the alkylene oxide residues may shield the positive charge at the quaternary ammonium site from incompatible anionic components. The examples herein demonstrate that at least 5 alkylene oxide residues are required in the quaternary ammonium compound for it to be compatible with the aqueous binder system.

In addition, a maximum of 12 alkylene oxide residues are required in the quaternary ammonium compound. Without being bound by theory, it is believed that more than 12 alkylene oxide residues will undesirably impair the hardness and/or chemical resistance of a cured coating formed from a coating composition comprising the quaternary ammonium compound.

The quaternary ammonium compounds also provide an unexpectedly high antimicrobial activity (e.g. a strong antibacterial effect) to a cured coating in which they are contained at a predetermined amount. Due to their hydroxyl functionality, the quaternary ammonium compounds are reactive additives and react into the polymeric matrix formed when the coating composition is cured. This may be beneficial by preventing leaching of the quaternary ammonium compound from the coating since it has reacted into the polymeric matrix. By reacting the quaternary ammonium compound directly into the polymeric matrix, this may also improve the anti-microbial effect through exposing the positive charge at the quaternary ammonium site near or at the surface of the coating. Bacteria and other microbes may be repelled from the surface of a cured coating if the surface has a significant amount of positive charge sites on it.

Thus viewed from a first aspect, the present invention provides an aqueous binder system for a coating composition, the aqueous binder system comprising:
A) at least 10 wt % water, based on the total weight of the aqueous binder system;
B) at least one hydroxyl-functional binder polymer; and
C) from 0.1 to 20 wt %, based on the total weight of the aqueous binder system, of at least one quaternary ammonium compound, wherein the quaternary ammonium compound comprises a core quaternary ammonium group which has pendant groups which comprise:
   i) a hydrocarbyl group having 8 to 16 carbon atoms which is a linear or branched, alkyl or alkenyl group; and ii) two independent hydroxyl terminated groups, wherein each hydroxyl terminated group comprises from 1 to 10 alkylene oxide residues and wherein the total number of alkylene oxide residues in the quaternary ammonium compound is from 5 to 12;

wherein B) and C) are not covalently bonded to each other within the aqueous binder system.

Viewed from a second aspect the invention provides a coating composition comprising an aqueous binder system according to the first aspect and a polyisocyanate.

Viewed from a third aspect, the invention provides a coating obtainable by curing a coating composition according to the second aspect so that B) and C) react with the polyisocyanate to form a polymeric matrix.

Viewed from a fourth aspect, the invention provides a method of providing an anti-microbial coating on a substrate comprising the steps of applying a coating composition according to the second aspect to the substrate and curing the coating composition.

Viewed from a fifth aspect, the invention provides the use of a quaternary ammonium compound as described herein to provide an anti-microbial activity to a coating by reacting the quaternary ammonium compound into a polymeric matrix formed upon curing an aqueous coating composition.

Any aspect of the invention may include any of the features described herein with regard to that aspect of the invention or any other aspects of the invention.

DETAILED DESCRIPTION OF THE INVENTION

It will be understood that any upper or lower quantity or range limit used herein may be independently combined.

It will be understood that, when describing the number of carbon atoms in a substituent group (e.g. 'C1 to C6'), the number refers to the total number of carbon atoms present in the substituent group, including any present in any branched groups. Additionally, when describing the number of carbon atoms in, for example fatty acids, this refers to the total number of carbon atoms including the one at the carboxylic acid, and any present in any branch groups.

Many of the chemicals which may be used to produce the present invention are obtainable from natural sources. Such chemicals typically include a mixture of chemical species due to their natural origin. Due to the presence of such mixtures, various parameters defined herein can be an average value and may be non-integral.

It will be understood that a reference to a 'solid/s' part of a component or composition refers to all the parts of the component or composition which are not solvent or water. For example, the solids content of a coating composition is the sum of all parts excluding any solvent or water.

Components B) and C) are not covalently bonded to each other within the aqueous binder system. This may be advantageous because it may allow the quaternary ammonium compound to be more mobile within the aqueous binder system. Upon curing to form a coating, the quaternary ammonium compound may react with other components to form a polymeric matrix. The mobility of the quaternary ammonium compound before curing may allow it to get closer to the surface of the polymeric matrix before it is bound into the polymeric matrix so that its cationic charge is closer to the surface of the coating. Without being bound by theory, this may provide enhanced anti-microbial activity to the coating.

Aqueous Binder System Component A)—Water

The aqueous binder system of the invention comprises at least 10 wt % water, based on the total weight of the aqueous binder system.

Preferably, the aqueous binder system comprises at least 20 wt % water, more preferably at least 30 wt % water, particularly at least 40 wt % water, desirably at least 45 wt % water, especially at least 50 wt % water, all based on the total weight of the aqueous binder system. The aqueous binder system may comprise at most 90 wt % water, preferably at most 80 wt % water, particularly at most 75 wt % water, desirably at most 70 wt % water, all based on the total weight of the aqueous binder system. For example, the aqueous binder system may comprise from 40 to 80 wt % water, based on the total weight of the aqueous binder system.

Preferably the aqueous binder system comprises less than 10 wt % non-aqueous solvent, more preferably less than 5 wt %, particularly less than 2 wt %, desirably less than 1 wt %, and especially 0 wt %, all based on the total weight of the aqueous binder system. The aqueous binder system may comprise substantially no non-aqueous solvent. The non-aqueous solvent may be an organic solvent.

The weight ratio of water to quaternary ammonium compound in the aqueous binder system may be at most 20:1, preferably at most 15:1, more preferably at most 10:1. The weight ratio of water to quaternary ammonium compound in the aqueous binder system may be at least 0.5:1, preferably at least 1:1, more preferably at least 2:1, particularly at least 4:1, desirably at least 5:1.

Aqueous Binder System Component B)—Hydroxyl-Functional Binder Polymer

The aqueous binder system comprises B) at least one hydroxyl-functional binder polymer.

The hydroxyl-functional binder polymer may be a coating binder polymer. The binder polymer may be a coating resin binder polymer. The binder polymer may not comprise a quaternary ammonium group. The binder polymer may be hydrophillic. The binder polymer may comprise at least one hydroxyl group, preferably at least two. The binder polymer may comprise at most 10 hydroxyl groups, preferably at most 8. The binder polymer may be a polyol.

The hydroxyl-functional binder polymer may water soluble. At room temperature (20° C.), the binder polymer may have a solubility of at least 1 g/100 g water, preferably at least 5 g/100 g water, particularly at least 10 g/100g water. The binder polymer may be emulsifiable and/or dispersible in water, preferably dispersible. The aqueous binder system may comprise an emulsion and/or dispersion of B) in the water A).

The hydroxyl-functional binder polymer may have a hydroxyl value, measured in accordance with DIN 53240-2 (potentiometric), of at least 10, preferably at least 50, more preferably at least 100 mg KOH/g. The binder polymer may have a hydroxyl value of at most 250, preferably at most 200, more preferably at most 150, particularly at most 140 mg KOH/g.

The hydroxyl-functional binder polymer may have a number average molecular weight Mn, determined by end group analysis with reference to the hydroxyl value, of at least 900, preferably at least 1300, more preferably at least 1500, particularly at least 2000 g/mol. The binder polymer may have a number average molecular weight Mn, of at most 20,000, preferably at most 10,000, more preferably at most 6000, particularly at most 4000 g/mol.

Preferably the hydroxyl-functional binder polymer is selected from poly(meth)acrylates, polyurethanes, polyesters and co-polymers thereof. The binder polymer may be a (meth)acrylic polymer polyol, a urethane polymer polyol, a (meth)acrylic-urethane polymer polyol or a polyester polyol. Preferably the binder polymer is a (meth)acrylic polyol dispersion or a polyurethane polyol dispersion. If a higher hardness is desired in the cured coating, the binder polymer may comprise a (meth)acrylic polymer component. The binder polymer may comprise dimethylolpropionic acid (DMPA) as a monomer, especially as part of a urethane polymer component.

Commercial examples of a suitable hydroxyl-functional binder polymer carried in water include the Setaqua™ series (e.g. 6515, 6516, 6520 etc.) which are acrylic polyol emulsions/dispersions in water from Allnex. Further examples include Alberdingk™ AC2594, an acrylic polyol dispersion and Alberdingk DUR 95 VP, an OH-terminated polyurethane dispersion from Alberdingk Boley. Other examples include acrylic polyol dispersions Bayhydrol™ A2542, A2646, A2546 from Covestro.

The aqueous binder system may comprise at least 5 wt % of hydroxyl functional binder polymer, preferably at least 10 wt %, more preferably at least 15 wt % and particularly at least 20 wt %, all based on the total weight of the aqueous binder system. The aqueous binder system may comprise at most 70 wt % of hydroxyl functional binder polymer, preferably at most 60 wt %, more preferably at most 50 wt %, particularly at most 40 wt %, all based on the total weight of the aqueous binder system.

Preferably the aqueous binder system comprises from 10 to 50 wt % hydroxyl functional binder polymer, based on the total weight of the aqueous binder system.

The weight ratio of hydroxyl functional binder polymer to quaternary ammonium compound in the aqueous binder system may be at most 10:1, preferably at most 8:1, more preferably at most 5:1. The weight ratio of hydroxyl functional binder polymer to quaternary ammonium compound in the aqueous binder system may be at least 1:1, preferably at least 2:1, more preferably at least 3:1, particularly at least 4:1.

Aqueous Binder System Component C)—Quaternary Ammonium Compound

The aqueous binder system comprises C) from 0.1 to 20 wt %, based on the total weight of the aqueous binder system, of at least one quaternary ammonium compound, wherein the quaternary ammonium compound comprises a core quaternary ammonium group which has pendant groups which comprise:
  i) a hydrocarbyl group having 8 to 16 carbon atoms which is a linear or branched alkyl or alkenyl group; and
  ii) two independent hydroxyl terminated groups, wherein each hydroxyl terminated group comprises from 1 to 10 alkylene oxide residues and wherein the total number of alkylene oxide residues in the quaternary ammonium compound is from 5 to 12.

In total, the quaternary ammonium group has 4 pendant groups.

The hydrocarbyl group may have at least 9 carbon atoms, preferably at least 10, particularly at least 11. The hydrocarbyl group may have at most 15 carbon atoms, preferably at most 14, particularly at most 13. The hydrocarbyl group may be linear. The hydrocarbyl group may be saturated. The hydrocarbyl group may be an alkyl group. One or more of these preferences may also apply to $R^1$ in formula (I).

Each hydroxyl terminated group comprises from 1 to 10 alkylene oxide residues. The alkylene oxide residues in each group are typically present as a polyalkylene oxide chain. Each polyalkylene oxide chain preferably has the formula: —$(C_rH_{2r}O)_q$— where q is the number of alkylene oxide residues in the chain and r is 2, 3 or 4, preferably 2 or 3, i.e. an ethyleneoxy (—$C_2H_4O$—) or propyleneoxy (—$C_3H_6O$—) group. There may be different alkylene oxide residues along each polyalkylene oxide chain. It is desirable that each polyalkylene oxide chain is a homopolymeric ethylene oxide chain. However, the chain may be a homopolymeric chain of propylene oxide residues or a block or random copolymer chain containing both ethylene oxide and propylene oxide residues. The molar amount of ethylene oxide residues as a percentage of total alkylene oxide residues in the quaternary ammonium compound may be at least 50 mol %, preferably at least 70 mol %, more preferably at least 80 mol %. The molar amount of ethylene oxide residues as a percentage of total alkylene oxide residues in the quaternary ammonium compound may be at most 100 mol %, preferably at most 90 mol %, more preferably at most 80 mol %. The molar amount of ethylene oxide residues as a percentage of total alkylene oxide residues in the quaternary ammonium compound may be 100%.

The average number of alkylene oxide residues in each polyalkylene oxide chain of the quaternary ammonium compound, i.e. the value of parameter q, is in the range from 1 to 10, preferably 1 to 7, more preferably 2 to 6. Alternatively, the value of parameter q may be from 1 to 3, preferably from 2 to 3.

The total number of alkylene oxide residues in the quaternary ammonium compound i.e. the sum of m+n in formula (I), is in the range from 5 to 12, preferably 5 to 11, more preferably 5 to 10, particularly 5 to 9, and especially 5 to 8. Alternatively, the total number of alkylene oxide residues in the quaternary ammonium compound may be in the range from 5 to 7, preferably from 5 to 6.

The core quaternary ammonium group has a further pendant group iii) which comprises a C1 to C8 hydrocarbyl group, more preferably a C1 to C6 alkyl group, particularly a C1 to C4 alkyl group and desirably a methyl group.

The quaternising agent used to form the core quaternary ammonium group may be selected from organic sulphates, nitrates, phosphates, acetates or halides, preferably organic halides, particularly alkyl halides. The quaternising agent may comprise methyl chloride or bromide, preferably methyl chloride.

Preferably, the quaternary ammonium compound is of formula (I):

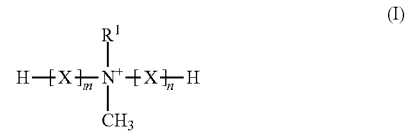

wherein:
  $R^1$ is a hydrocarbyl group having 8 to 16 carbon atoms which is a linear or branched alkyl or alkenyl group;
  m and n independently have a value from 1 to 10, preferably from 1 to 7, particularly preferably from 2 to 6;
  the sum of m+n is from 5 to 12; and
  each X is independently selected from an ethylene oxide residue terminating at —O and a propylene oxide residue terminating at —O; such that the compound of formula (I) comprises two terminal hydroxyl groups.

The features and preferences described herein for the quaternary ammonium compound are also features and preferences applicable to formula (I).

The aqueous binder system may comprise at least two quaternary ammonium compounds, preferably two or three, particularly two quaternary ammonium compounds. Each quaternary ammonium compound may independently be as described herein.

The aqueous binder system may comprise at least 0.5 wt % of quaternary ammonium compound, preferably at least 1 wt %, more preferably at least 2 wt % and particularly at least 4 wt %, all based on the total weight of the aqueous binder system. The aqueous binder system may comprise at most 18 wt % of quaternary ammonium compound, preferably at most 15 wt %, more preferably at most 12 wt %, particularly at most 10 wt %, all based on the total weight of the aqueous binder system.

Optional Component D)—Further Additives

The aqueous binder system may comprise one or more further additives. These additives may be selected from pigments, dyes, catalysts, rheology modifiers, wetting agents, defoamers, stabilisers, fillers, emulsifiers, dispersants and other surfactants.

The aqueous binder system may comprise a pigment. Examples of organic pigments are azo pigments, phthalocyanine, quinacridone. Examples of inorganic pigments are iron oxide pigments, titanium dioxide and carbon black.

The aqueous binder system may comprise a dye. Examples of dyes are azo, azine, anthraquinone, acridine, cyanine, oxazine, polymethine, thiazine and triarylmethane dyes. These dyes may be employed as basic or cationic dyes, metal complex, reactive, acid, sulfur, coupling or substantive dyes.

Preferably the aqueous binder system comprises at least one pigment or dye. In an alternative embodiment, the aqueous binder system may comprise no pigment or dye. An aqueous binder system comprising no pigment or dye may be used in a coating composition which forms a clear coating (or clearcoat). Such a coating composition may be used as a primer or topcoat.

The aqueous binder system may comprise a catalyst. Suitable catalysts include the normal polyurethane catalysts such as compounds of divalent and tetravalent tin, more particularly the dicarboxylates of divalent tin and the dialkyl tin dicarboxylates and dialkoxylates. Examples include dibutyl tin dilaurate, dibutyl tin diacetate, dioctyl tin diacetate, dibutyl tin maleate, tin(II) octoate, tin(II) phenolate, and the acetyl acetonates of divalent and tetravalent tin. In addition, tertiary amines or amidines may also be employed, either alone or in combination with the aforementioned tin compounds. Examples of amines include tetramethyl butane diamine, bis-(dimethylaminoethyl)-ether, 1,4-diazabicyclooctane (DABCO), 1,8-diazabicyclo-(5.4.0)-undecane, 2,2'-dimorpholinodiethyl ether, dimethyl piperazine, and mixtures thereof.

The aqueous binder system may comprise a stabiliser. Suitable stabilizers include materials which stabilize the viscosity of the aqueous binder system during its production, storage and application, and include monofunctional carboxylic acid chlorides and non-corrosive inorganic acids. Examples of such stabilizers are benzoyl chloride, phosphoric acid or phosphorous acid. In addition, suitable hydrolysis stabilizers include for example the carbodiimide type. Stabilizers which are antioxidants or UV absorbers may also be used. Examples of such stabilizers are HALS hindered amine light stabilisers, hydrogen-donating antioxidants such as hindered phenols and secondary aromatic amines, benzofuranone, oxanilides, benzophenones, benzotriazoles and UV absorbing pigments.

The aqueous binder system may comprise a surfactant. Suitable surfactants include silicone surfactants such as dimethylpolysiloxane, polyoxyalkylene polyol-modified dimethylpolysiloxane and alkylene glycol-modified dimethylpolysiloxane; and anionic surfactants such as fatty acid salts, sulphuric acid ester salts, phosphoric acid ester salts and sulphonates. Preferably the aqueous binder system comprises at least one surfactant selected from anionic surfactants and non-ionic surfactants.

The aqueous binder system may comprise a filler. Suitable fillers include inorganic fillers such as clay, chalk, and silica.

The aqueous binder system may comprise at least 0.5 wt %, preferably at least 1 wt %, particularly at least 2 wt % of such further additives, based on the total weight of the aqueous binder system. The aqueous binder system may comprise at most 10 wt %, preferably at most 8 wt %, particularly at most 6 wt % of such further additives, based on the total weight of the aqueous binder system.

Coating Composition

The present invention also provides a coating composition comprising an aqueous binder system as described herein and a polyisocyanate. Preferably, the coating composition is an aqueous coating composition. The coating composition may be a polyurethane coating composition, preferably a two component (2K) polyurethane coating system. The aqueous binder system may be the first component and the polyisocyanate may be the second component of a two component polyurethane coating system.

The polyisocyanate may be hydrophillic. Preferred hydrophilic polyisocyanates are those containing hydrophilic, nonionic groups. The hydrophilic polyisocyanate may comprise at least one polyalkylene ether group. The polyisocyanate may be emulsifiable and/or dispersible in water, preferably dispersible. The polyisocyanate may not comprise a quaternary ammonium group.

The polyisocyanate may be aliphatic, including cycloaliphatic, or aromatic. The polyisocyanate may be selected from ethylene diisocyanate, 1,2-diisocyanatopropane, 1,3-diisocyanatopropane, 1,6-diisocyanatohexane, 1,4-butylene diisocyanate, lysine diisocyanate, hexamethylene diisocyanate (HDI), 1,4-methylene bis-(cyclohexylisocyanate) and isophorone diisocyanate. Suitable aromatic isocyanates may be selected from toluene diisocyanate, m-phenylene diisocyanate, p-phenylene diisocyanate, xylylene diisocyanate, 4,4'-diphenylmethane diisocyanate, polymethylenepolyphenyl diisocyanate, 3,3'-dimethyl-4,4'-biphenylene diisocyanate, 3,3'-dimethyl-4,4'-diphenylmethane diisocyanate, 3,3-dichloro-4,4'-biphenylene diisocyanate, 1,5-naphthalene diisocyanate, or modified compounds thereof such as uretonimine-modified compounds thereof. Aliphatic polyisocyanates are preferred, particularly hexamethylene diisocyanate and isophorone diisocyanate.

The polyisocyanate may be selected from aliphatic polyisocyanates and hydrophillic polyisocyanates.

Also suitable for use are the biurets, alophonates and/or isocyanurates of such aliphatic or aromatic polyisocyanates. Preferred for use in the invention are the biurets and isocyanurate of polyisocyanates, especially of the aliphatic polyisocyanates such as hexamethylene diisocyanate and isophorone diisocyanate. Most preferred are the biurets and isocyanurates of hexamethylene diisocyanate.

The polyisocyanate may have an isocyanate (NCO) value, measured as described herein, of at least 10 wt %, preferably at least 15 wt %. The polyisocyanate may have an isocyanate value, measured as described herein, of at most 30 wt %, preferably at most 25 wt %.

Commercial examples of suitable polyisocyanates include Bayhydur™ XP2565, N3900, XP2730, Easaqua™ XD 401, XL 600, M 501 and Tolonate HDT-LV.

The coating composition may comprise more than one polyisocyanate, preferably 2 or 3, particularly 2. The polyisocyanates may be selected from those described herein.

The coating composition may comprise at least 1 wt % polyisocyanate, preferably at least 2 wt %, particularly at least 5 wt %, desirably at least 10 wt %, all based on the total weight of the coating composition. The coating composition may comprise at most 50 wt % polyisocyanate, preferably at most 40 wt %, particularly at most 30 wt %, all based on the total weight of the coating composition.

The molar ratio of free isocyanate groups to free hydroxyl groups in the solids part of the coating composition prior to curing (NCO/OH ratio) may be at least 0.7, preferably at least 0.8, more preferably at least 0.9, particularly at least 1. The NCO/OH ratio may be at most 3, preferably at most 2.5, more preferably at most 2, particularly at most 1.8. A higher NCO/OH ratio may provide improved hardness and/or chemical resistance to a cured coating.

The coating composition may have a total solids content, according to DIN EN ISO 3251 of at least 25 wt %, preferably at least 30 wt %, more preferably at least 35 wt %, particularly at least 40 wt %, based on the total weight of the coating composition. The coating composition may have a total solids content of at most 80 wt %, preferably at most 70 wt %, more preferably at most 65 wt %, particularly at most 60 wt %, based on the total weight of the coating composition.

The coating composition may comprise at least 10 wt % water, preferably at least 20 wt % water, particularly at least 30 wt % water, all based on the total weight of the coating composition. The coating composition may comprise at most 90 wt % water, preferably at most 80 wt % water, particularly at most 70 wt % water, all based on the total weight of the coating composition.

A coating composition of the invention may be applied to a substrate by any number of techniques including spray, brush, roller, paint mitt, and others as known in the art. Numerous substrates are suitable for application of the coating composition. The substrate may be selected from metal, particularly steel and aluminium, wood, brick, concrete and plastic. The substrate may be an exterior wall, interior wall or floor.

The coating composition may be applied as a primer coating on a substrate. A further coating layer such as an overcoat or topcoat may be applied on top of the primer coating. The coating composition may be applied as a topcoat. The coating composition may be a paint or lacquer, preferably a paint. The coating composition may comprise a colorant additive for example a pigment and/or dye.

The coating composition may be a clearcoat. The coating composition may be transparent or substantially transparent, preferably transparent. The coating composition may not comprise a colorant additive for example it may not comprise a pigment and/or dye.

The coating composition may be applied and cured at temperatures ranging from about 0° C. to about 50° C., preferably from 10° C. to 40° C. Preferably the coating composition is cured at ambient temperature (e.g. 20° C. to 30° C.). The coating may be cured without the use of an additional heat source. A lower curing temperature may reduce the likelihood of impairment of anti-microbial activity in the cured coating.

Coating.

The present invention also provides a coating obtainable by curing a coating composition as described herein so that B) and C) react with the polyisocyanate to form a polymeric matrix. Preferably the coating is obtained by curing a coating composition as described herein. A hydroxyl group on the hydroxyl functional binder polymer may react with the polyisocyanate. A hydroxyl group on the quaternary ammonium compound may react with the polyisocyanate.

Preferably the coating is an anti-microbial coating. The coating may have antimicrobial activity. The antimicrobial activity may be against bacteria, viruses and fungi, preferably against bacteria. The coating may have anti-microbial activity against gram-negative bacteria (e.g. *E. coli*) and gram-positive bacteria (e.g. *Staphylococcus* bacteria such as *S. simulans*).

The coating may have an antimicrobial activity, according to JIS Z 2801 as described herein, of at least a log 2 reduction of *E. coli* activity, preferably at least a log 2.1 reduction, more preferably at least a log 2.5 reduction, particularly at least a log 3 reduction. The coating may have an antimicrobial activity of at most a log 7 reduction of *E. coli* activity, preferably at most a log 6.5 reduction.

The coating may have an antimicrobial activity, according to ES Z 2801 as described herein, of at least a log 2 reduction of *Staphylococcus* activity (e.g. *S. simulans* activity), preferably at least a log 2.5 reduction, more preferably at least a log 3 reduction, particularly at least a log 3.5 reduction, desirably at least a log 4 reduction. The coating may have an antimicrobial activity of at most a log 7 reduction of *Staphylococcus* activity, preferably at most a log 6.5 reduction.

A high level of anti-microbial activity in the coating may be due in part to the quaternary ammonium compound being mobile within the aqueous binder system. Without being bound by theory, the presence of the water as a polar solvent may allow the quaternary ammonium compound to react into the polymeric matrix formed when the coating is cured at a position near to the surface of the coating, thus allowing the positive charge on the quaternary ammonium compound to have a greater anti-microbial effect.

The coating may comprise at least 1 wt % of the quaternary ammonium compound, preferably at least 2 wt %, more preferably at least 4 wt %, particularly at least 6 wt %, on the basis of the total weight of the coating. The coating may comprise at most 20 wt % of the quaternary ammonium compound, preferably at most 18 wt %, more preferably at most 16 wt %, particularly at most 14 wt %, desirably at most 12 wt % on the basis of total weight of the coating.

The coating may comprise at least 1 wt % of the quaternary ammonium compound, preferably at least 2 wt %, more preferably at least 4 wt %, particularly at least 6 wt %, on the basis of the total solids content of the coating. The coating may comprise at most 20 wt % of the quaternary ammonium compound, preferably at most 18 wt %, more preferably at most 16 wt %, particularly at most 14 wt %, desirably at most 12 wt % on the basis of the total solids content of the coating.

The hardness of the coating may indicate the resistance of the coating to a mechanical force such as pressure, rubbing or scratching. The hardness of the coating may be measured by the König hardness. The coating (after curing) may have a König hardness of at least 50 s, preferably at least 60 s, more preferably at least 70 s, particularly at least 80 s when measured according to DIN ISO 2815. The coating may have a König hardness of at most 180 s, preferably at most 170 s, when measured according to DIN ISO 2815.

The coating may be an industrial coating, architectural coating, metal coating, plastic coating, exterior wall coating, interior wall coating or floor coating. The coating may be a primer coating or a top coating. The coating may be a clear (e.g. transparent) coating.

The invention also provides a method of providing an anti-microbial coating on a substrate comprising the steps of applying a coating composition as described herein to the substrate and curing the coating composition.

The invention also provides the use of a quaternary ammonium compound as described herein to provide an anti-microbial activity to a coating by reacting the quaternary ammonium compound into a polymeric matrix formed upon curing an aqueous coating composition.

Any or all of the disclosed features, and/or any or all of the steps of any method or process described, may be used in any aspect of the invention.

EXAMPLES

The invention is illustrated by the following non-limiting examples.

It will be understood that all test procedures and physical parameters described herein have been determined at atmospheric pressure, room temperature (i.e. about 20° C.) and a relative humidity of 50% unless otherwise stated herein, or unless otherwise stated in the referenced test methods and procedures.

All parts and percentages are given by weight unless otherwise stated. All references to 'solids' in the examples refer to the part of a component which is not solvent or water.

Compounds used in the examples are identified as follows:

Setaqua™ 6515—an acrylic polyol emulsion from Allnex
Setaqua 6516—an acrylic polyol emulsion from Allnex
Setaqua 6520—an acrylic polyol dispersion from Allnex
Alberdingk™ AC2594—an acrylic polyol dispersion from Alberdingk Boley
TEGO™ Foamex 822—a defoamer emulsion from Evonik
BYK™ 349—a wetting agent from BYK
Tafigel™ PUR 40—a rheology modifier from Munzing Chemie GmbH
Bayhydur™ XP2655—polyisocyanate based on hexamethylene diisocyanate from Covestro.

Test Methods

In this specification, the following test methods have been used:

(i) Number average molecular weight was determined by end group analysis with reference to the hydroxyl value.

(ii) The hydroxyl value is defined as the number of mg of potassium hydroxide equivalent to the hydroxyl content of 1 g of sample, and was measured by acetylation followed by hydrolysation of excess acetic anhydride. The acetic acid formed was subsequently titrated with an ethanolic potassium hydroxide solution.

(iii) The acid value is defined as the number of mg of potassium hydroxide required to neutralise the free fatty acids in 1 g of sample, and was measured by direct titration with a standard potassium hydroxide solution.

(iv) The isocyanate (NCO) value or content is defined as the weight % content of isocyanate in the sample on the basis of the total weight of the sample and was determined by reacting with excess dibutylamine, and back titrating with hydrochloric acid.

(v) The % cationic active in a cationic quaternary ammonium compound with known molecular weight is determined using a titration with anionic solution according to ISO 2871.

(vi) König hardness was tested according to DIN ISO 2815

(vii) Chemical resistance was evaluated according to DIN12720 in which coating samples were spot tested for a predetermined time and given a rating from 5=undamaged to 0=complete damage.

(viii) Antimicrobial properties of the cured coatings were determined according to the Japanese standard JIS Z 2801 (2010) 'Antibacterial products—test for antibacterial activity and efficacy'. Antimicrobial activity was tested against $S.$ $simulans$ (ATCC 27848; gram positive bacteria) & $E.$ $coli$ (ATCC 23716; gram negative bacteria). The coatings were applied to Lenata P121-10N sheets with the use of a Bird applicator in 120 μm wet coating thickness and cured at ambient temperatures for at least 1 week. Microbial suspensions were prepared and adjusted to $1\times10^5$-$1\times10^6$ cells/ml. Coating samples were placed in petri dishes and inoculated with 0.1 ml of these suspensions. The inoculant was covered with a glass sheet and the samples were incubated for 24 hours at 35° C. (bacteria). After incubation 10 ml broth was added to each petri dish, the cover glass sheet was removed and the viable microbes were mixed into the broth by gently swirling of the petri dish. The wash-out was diluted 100 and 1000 times and wash-out and dilutions were plated using appropriate nutrient agar for the microbes. The plates were incubated at 24 hours at 35° C. (bacteria) after which the colonies were counted. The antimicrobial activity was calculated by subtraction of the log number of the viable microbes of the tested coating from that of the reference substrate (glass sheet). A log 2 reduction is defined as 'antimicrobial' and is equivalent to inactivation of 99% of microbes. The tests were carried out in duplicate.

EXAMPLE 1

A quaternary ammonium compound according to the invention was synthesised as follows.

100 parts by weight of cocoamine-2EO (the cocoamine-2EO is an amine derived from coconut fatty acid which comprises C12 alkyl amine which has then been ethoxylated with 2 mols of ethylene oxide—hence 2EO) and 0.17 parts by weight catalyst (caustic potash, 45 wt % in water) were charged to a pressurised reactor (Parr). With agitation and nitrogen sweep on the temperature was raised to 150-160° C. slowly. Upon reaching this temperature, ethylene oxide is feed to the reactor. The reaction was held at this temperature for 2 hours after the addition until the desired acid and hydroxyl values were obtained. The resulting product contained 8 ethylene oxide residues (8EO) in total, split between 2 ethylene oxide chains having an average of 4EO each. The product had an acid value <2 mg KOH/g and a hydroxyl value of 200-215 mg KOH/g. This product is referred to as cocoamine-8EO.

100 parts by weight (1 mol) of the cocoamine-8EO was charged to a pressurised reactor (Parr) with agitation and nitrogen sweep on. The temperature was raised to 75-80° C. and 1 psi pressure with $N_2$ for 30 minutes. 8.6 parts by weight (1 mol) of Methyl Chloride was added to the reactor to quaternise the cocoamine-8EO. The reaction was continued until the desired acid and hydroxyl values and amount of quaternisation were obtained. The resulting product had an acid value <1 mg KOH/g, and a hydroxyl value of 107 mg KOH/g and will be referred to as coco-8EO-quat. The % cationic active of the coco-8EO-quat was tested according to ISO 2871 and determined to be at least 90%.

EXAMPLE 2

Several alkoxylation variants of the quaternary ammonium compound (Quat) of Example 1 were prepared following an equivalent procedure but varying the amount of ethylene oxide (EO) residues and propylene oxide (PO) residues in the product.

Two comparative examples not according to the invention (coco-3EO-quat & coco-4EO-quat) were also produced which have less than the minimum of 5 alkylene oxide residues in the Quat which is required by the invention.

All Quat variants were then tested for compatibility in an aqueous binder system according to the invention. The composition of the aqueous binder system tested for compatibility using Setaqua 6520 is shown in Table 1.

TABLE 1

| Component | Wt % solids | Wt % water | Wt % Total |
|---|---|---|---|
| Setaqua 6520 comprising hydroxyl functional binder polymer | 34.2 | 41.8 | 76 |
| Water | — | 11 | 11 |
| Quat (50% Quat solids in water) | 6.5 | 6.5 | 13 |
| Total | 40.7 | 59.3 | 100 |

Further hydroxyl functional binder polymers in Setaqua 6515, 6516 and Alberdingk AC2594 were also tested for compatibility as shown in Table 2. The compatibility evaluation was a visual check that no phase separation had occurred by 1 hour after the components were mixed together. The results are shown in Table 2 in which Compatible is shown as "+" and Not Compatible is shown as "−".

TABLE 2

| Quaternary Ammonium Compound (Quat) | Compatibility with hydroxyl functional binder polymer (*) | | | |
|---|---|---|---|---|
| | Setaqua | | | Alberdingk |
| | 6515 | 6516 | 6520 | AC2594 |
| Comparative - coco-3EO-quat | − | − | − | − |
| Comparative - coco-4EO-quat | − | − | − | − |
| coco-5EO-quat | + | + | + | + |
| coco-8EO-quat | + | + | + | + |
| coco-10EO-quat | + | + | + | + |
| coco-12EO-quat | + | + | + | + |
| coco-2PO/6EO-quat | + | + | + | + |
| coco-4PO/4EO-quat | + | + | + | + |

(*) = Compatible is shown as "+" and Not Compatible is shown as "−".

It can be seen from Table 2 that the comparative examples are not compatible with the hydroxyl functional binder polymers in the aqueous binder system. It is believed that this is because the degree of ethoxylation (3 & 4 mols EO) of the comparative examples is too low.

EXAMPLE 3

The properties of cured coatings formed from coating compositions comprising the aqueous binder system of the present invention were investigated. A coating composition comprising Setaqua 6520 is shown in Table 3. The water-based parts A1 and A2 make up 100 wt % of the aqueous binder system. The polyisocyanate part B is added at 19 parts by weight (wt %) to 100 parts by weight of the aqueous binder system (A1+A2).

TABLE 3

| Part | Components | Wt % solids | Wt % water | Wt % of aqueous binder system |
|---|---|---|---|---|
| A1 | Setaqua 6520 | 30.6 | 37.4 | 68 |
| | TEGO Foamex 822 | 0.3 | — | 0.3 |
| | BYK 349 | 0.3 | — | 0.3 |
| | Tafigel PUR 40 | 0.3 | — | 0.3 |
| | Water | — | 17 | 17 |
| A2 | Quat (40% Quat solids in water) | 5.6 | 8.4 | 14 |
| Total aqueous binder system | Total A1 + A2 | 37.1 | 62.8 | 100 |
| B | Bayhydur XP2655 | 19 | — | 19 |

The coating composition was prepared by mixing first the ingredients mentioned under part A1 until a uniform mixture at room temperature was achieved, followed by the addition of part A2 and mixed again until a uniform aqueous binder system was achieved. A comparative example without A2 was also made.

Immediately before the application of the coating composition to the substrate, the isocyanate mentioned under part B was added to the aqueous binder system (A1+A2) and mixed. The coating composition was applied on glass as a substrate on which 120 μm films of the coating composition was applied with the aid of an applicator frame (BYK PA-2030) for the hardness and chemical resistance evaluation. For the microbial evaluation the coating composition was applied on to Lenata P121-10N sheets.

The cured coating properties were evaluated and the results are given in Table 4.

TABLE 4

| Coating composition based on Setaqua 6520 | Comparative Example | coco-5EO-quat | coco-8EO-quat | coco-12EO-quat | coco-2PO/6EO-quat |
|---|---|---|---|---|---|
| Wt % of quat solids on basis of total solids in coating (A1 + A2 + B) | 0 | 10 | 10 | 10 | 10 |
| König hardness (s) | 184 | 154 | 162 | 94 | 81 |
| Chemical resistance: 5 = undamaged to 0 = complete damage. | | | | | |
| acetone | 5 | 5 | 4 | 5 | 5 |
| ethyl acetate | 5 | 4 | 4 | 4 | 4-5 |
| acetic acid | 5 | 4 | 3 | 3 | 3 |
| 70% EtOH | 5 | 2-3 | 4-5 | 4 | 3 |
| 5% NaCl | 5 | 5 | 5 | 4 | 5 |
| NH4OH | 5 | 5 | 5 | 5 | 5 |
| Water | 5 | 3-4 | 3-4 | 4 | 4 |
| Antimicrobial activity evaluation according to JIS Z 2801 (2010) (Log reduction) | | | | | |
| E. coli | 0 | 6.2 | 2 | 2 | 3.9 |
| S. Simulans | 0.3 | >5.1 | >5.1 | >5.1 | >5.1 |

It can be seen from Table 4 that the comparative example without quaternary ammonium compound had the highest hardness and chemical resistance in the coating but did not have an anti-microbial effect. All of the other examples according to the invention had a significant anti-microbial effect as demonstrated by a log reduction of *E. coli* (gram-negative bacteria) and *Staphylococcus simulans* (*S. simulans*, gram-positive bacteria) activity of at least 2. A log reduction of 2 is equivalent to an inhibition of 99% of microbial activity. It can also be seen that when there is 12 mols of ethoxylation in the quaternary ammonium compound, the hardness of the cured coating is significantly reduced (94 s) when compared with 5 mols (154 s) and 8 mols (162 s).

EXAMPLE 4

A variation of the coating compositions of Example 3 was made by exchanging Setaqua 6520 in Table 3 with Alberdingk AC2594. The results are given in Table 5.

TABLE 5

| Coating composition based on Alberdingk AC2594 | Comparative Example | coco-5EO-quat | coco-8EO-quat | coco-12EO-quat | coco-2PO/ 6EO-quat | coco-4PO/ 4EO-quat |
|---|---|---|---|---|---|---|
| Wt % of quat solids on basis of total solids in coating (A1 + A2 + B) | 0 | 10 | 10 | 10 | 10 | 10 |
| König hardness (s) | 132 | 81 | 96 | 93 | 115 | 127 |
| Chemical resistance: 5 = undamaged to 0 = complete damage. | | | | | | |
| acetone | 5 | 4 | 4 | 3 | 5 | 5 |
| ethyl acetate | 4 | 4 | 4 | 5 | 4-5 | 5 |
| acetic acid | 4 | 3-4 | 3 | 3 | 3 | 4 |
| 70% EtOH | 4 | 3-4 | 3-4 | 2-3 | 2-3 | 5 |
| 5% NaCl | 4 | 4 | 4 | 2 | 5 | 4 |
| NH4OH | 5 | 5 | 5 | 5 | 5 | 5 |
| Water | 5 | 3-4 | 3-4 | 2 | 2-3 | 2-3 |
| Antimicrobial activity evaluation according to JIS Z 2801 (2010) (Log reduction) | | | | | | |
| *E. coli* | 0 | 3.5 | 3 | 2.1 | 2.3 | 2 |
| *S. Simulans* | 0.9 | >5.1 | >5.1 | 5.4 | 4.6 | 3.2 |

It can be seen from Table 5 that the comparative example without quaternary ammonium compound had the highest hardness but did not have a significant anti-microbial effect. All of the other examples according to the invention had an anti-microbial effect as demonstrated by a log reduction of *E. coli* and *S. simulans* activity of at least 2. A log reduction of 2 is equivalent to an inhibition of 99% of microbial activity. It can also be seen that when there is 12 mots of ethoxylation in the quaternary ammonium compound, the chemical resistance of the coating is reduced.

It is to be understood that the invention is not to be limited to the details of the above embodiments, which are described by way of example only. Many variations are possible.

The invention claimed is:

1. An aqueous binder system for a coating composition, the aqueous binder system comprising:
   A) at least 10 wt % to 90 wt % water, based on the total weight of the aqueous binder system;
   B) at least one hydroxyl-functional binder polymer; and
   C) from 0.1 to 20 wt %, based on the total weight of the aqueous binder system, of at least one quaternary ammonium compound, wherein the quaternary ammonium compound comprises a core quaternary ammonium group which has pendant groups which comprise:
   i) a hydrocarbyl group having 8 to 16 carbon atoms which is a linear or branched, alkyl or alkenyl group;
   ii) two independent hydroxyl terminated groups, wherein each hydroxyl terminated group comprises from 1 to 10 alkylene oxide residues and wherein the total number of alkylene oxide residues in the quaternary ammonium compound is from 5 to 12; and
   iii) a C1 to C8 hydrocarbyl group;
   wherein B) and C) are not covalently bonded to each other within the aqueous binder system.

2. The aqueous binder system according to claim 1 wherein the quaternary ammonium compound is of formula (I):

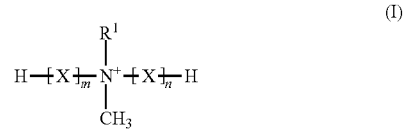

wherein:
R$^1$ is a hydrocarbyl group having 8 to 16 carbon atoms which is a linear or branched, alkyl or alkenyl group;
m and n independently have a value from 1 to 10;
the sum of m+n is from 5 to 12; and each X is independently selected from an ethylene oxide residue terminating at —O— and a propylene oxide residue terminating at —O—, such that the compound of formula (I) comprises two terminal hydroxyl groups.

3. The aqueous binder system according to claim 1 wherein the hydroxyl functional binder polymer is selected from poly(meth)acrylates, polyurethanes, polyesters and copolymers thereof.

4. The aqueous binder system according to claim 1 comprising from 40 to 80 wt % water, based on the total weight of the aqueous binder system.

5. The aqueous binder system according to claim 1 comprising from 10 to 50 wt % of the hydroxyl-functional binder polymer, based on the total weight of the aqueous binder system.

6. The aqueous binder system according to claim 1 comprising at least one pigment or dye.

7. The aqueous binder system according to claim 1 comprising at least one surfactant selected from anionic surfactants and non-ionic surfactants.

8. A coating composition comprising the aqueous binder system according to claim 1 and a polyisocyanate.

9. A coating obtained by curing all the coating composition according to claim 8 on a substrate so that B) and C) react with the polyisocyanate to form a polymeric matrix.

10. The coating according to claim 9 wherein the coating has an antimicrobial activity according to JIS Z 2801 of at least log 2 reduction of *E. coli* activity.

11. The coating according to claim 9 wherein the coating has an antimicrobial activity according to JIS Z 2801 of at least 2 reduction of *Staphylococcus* activity.

12. The coating according to claim 9 wherein the coating comprises at most 14 wt% of C) based on the total solids content in the coating.

13. A method of providing an anti-microbial coating on a substrate comprising the steps of applying the coating composition according to claim 8 to the substrate and curing the coating composition.

\* \* \* \* \*